US012178328B2

(12) United States Patent
Van De Kandelaar

(10) Patent No.: US 12,178,328 B2
(45) Date of Patent: Dec. 31, 2024

(54) MOBILE UNIT COMPRISING A COLLAPSIBLE DOME-SHAPED HOOD

(71) Applicant: MICRO-COSMOS HOLDING B.V., Nijmegen (NL)

(72) Inventor: Skip Van De Kandelaar, Nijmegen (NL)

(73) Assignee: MICRO-COSMOS HOLDING B.V., Nijmegen (NL)

( * ) Notice: Subject to any disclaimer, the term of this patent is extended or adjusted under 35 U.S.C. 154(b) by 0 days.

(21) Appl. No.: 18/568,540

(22) PCT Filed: Jun. 1, 2022

(86) PCT No.: PCT/EP2022/064958
§ 371 (c)(1),
(2) Date: Dec. 8, 2023

(87) PCT Pub. No.: WO2022/258461
PCT Pub. Date: Dec. 15, 2022

(65) Prior Publication Data
US 2024/0260764 A1 Aug. 8, 2024

(30) Foreign Application Priority Data
Jun. 9, 2021 (NL) ..................................... 2028419

(51) Int. Cl.
*A47C 29/00* (2006.01)
*A61G 10/00* (2006.01)
*A61G 10/04* (2006.01)

(52) U.S. Cl.
CPC .......... *A47C 29/003* (2013.01); *A61G 10/005* (2013.01); *A61G 10/04* (2013.01); *A47C 29/00* (2013.01); *A61G 10/00* (2013.01)

(58) Field of Classification Search
CPC .... A47C 29/003; A47C 29/00; A61G 10/005; A61G 10/04; A61G 10/00
(Continued)

(56) References Cited

U.S. PATENT DOCUMENTS 1,702,010 A * 2/1929 Klever .................. A61G 7/051 5/81.1 R
2,036,033 A * 3/1936 Fisher .................... E04H 15/56 5/418
(Continued)

FOREIGN PATENT DOCUMENTS

CA 3222545 A1 * 12/2022 ........... A61G 12/001
CN 100400319 C 7/2008
(Continued)

*Primary Examiner* — Robert G Santos
(74) *Attorney, Agent, or Firm* — Hudak, Shunk & Farine Co. LPA

(57) ABSTRACT

For the purpose of covering at least the head of a person lying on a person supporting device such as a hospital bed or gurney, a unit having a hood is provided. The unit is particularly a mobile unit so that the unit can be easily put in place relative to a person supporting device or moved away from a person supporting device and taken to another area. The hood has a generally dome-shaped appearance and can be put in an expanded state and in a collapsed state according to desire. The hood is supported on a floor surface through a frame. Preferably, the unit is configured to enable adjustment of a height position of the hood relative to the floor surface. The hood provides privacy to a person and shields the person from external stimuli.

24 Claims, 4 Drawing Sheets

(58) Field of Classification Search
USPC .............................. 5/512, 658, 113, 121, 414
See application file for complete search history.

(56) References Cited

U.S. PATENT DOCUMENTS

| | | | | |
|---|---|---|---|---|
| 2,543,597 | A * | 2/1951 | Peery | E04H 15/38 5/418 |
| 2,932,833 | A * | 4/1960 | Wambach | A47G 9/1045 5/418 |
| 4,305,168 | A | 12/1981 | Holter et al. | |
| 5,116,288 | A * | 5/1992 | Kondo | A45B 23/00 2/9 |
| 5,320,405 | A * | 6/1994 | Foster | A47C 7/66 5/418 |
| 5,511,259 | A * | 4/1996 | Tarara | A61G 1/04 135/147 |
| 6,076,206 | A * | 6/2000 | Celaya | A47C 29/003 5/113 |
| 6,581,228 | B1 * | 6/2003 | Boskovich | A47D 5/006 5/503.1 |
| D598,229 | S * | 8/2009 | Allen | D6/601 |
| 7,591,032 | B2 * | 9/2009 | Harrison | E04H 15/38 5/8 |
| 8,464,379 | B1 * | 6/2013 | Zajac | A61G 1/04 5/113 |
| 9,506,269 | B2 * | 11/2016 | Armstrong | E04H 15/06 |
| 9,782,010 | B1 * | 10/2017 | Bodden-Burdick | A47C 7/666 |
| 11,490,699 | B2 * | 11/2022 | Amin | A45B 23/00 |
| D1,020,344 | S * | 4/2024 | Van De Kandelaar | D6/718.29 |
| 2007/0181172 | A1 * | 8/2007 | Harrison | A47C 1/14 5/418 |
| 2008/0283108 | A1 * | 11/2008 | Torres | E04H 15/38 135/149 |
| 2011/0146737 | A1 * | 6/2011 | Friedman | E04H 15/06 135/88.13 |
| 2012/0042920 | A1 * | 2/2012 | Armstrong | E04H 15/003 135/153 |
| 2016/0309916 | A1 | 10/2016 | Pothen et al. | |
| 2018/0177654 | A1 | 6/2018 | Muscarello et al. | |
| 2021/0219680 | A1 * | 7/2021 | Amin | H02S 10/40 |
| 2024/0260764 | A1 * | 8/2024 | Van De Kandelaar | A61G 10/04 |

FOREIGN PATENT DOCUMENTS

| | | | | |
|---|---|---|---|---|
| GB | 2434778 | A | 2/2006 | |
| WO | 2017145177 | A1 | 2/2016 | |
| WO | WO-2022258461 | A1 * | 12/2022 | A61G 12/001 |

* cited by examiner

MOBILE UNIT COMPRISING A COLLAPSIBLE DOME-SHAPED HOOD

FIELD OF THE INVENTION

The present invention relates to a unit comprising a collapsible hood having a generally dome-shaped appearance in an expanded state, the unit being configured to be used in combination with a device for supporting a person in a generally lying position and to be positioned at a head end of the device.

BACKGROUND OF THE INVENTION

US 2018/177654 A1 discloses a portable patient privacy apparatus that can be placed on a mattress of a hospital bed or gurney, e.g., above a fold line where the mattress is folded so that the patient may sit up to eat, converse with visitors, watch television, and the like. The portable patient privacy apparatus in various embodiments includes a U-shaped or polygonal-shaped base including a first end and a second end. The U-shaped or polygonal-shaped base is placed on the bed or gurney around the patient's head. Located above the base is a correspondingly U-shaped or polygonal-shaped member including a first end mated with the first end of the base and a second end mated with the second end of the base. A hood is located between the base and the member, wherein the hood is foldable such that when the member is laid against the base, the hood folds itself between the member and the base, and when the member is moved away from the base with the first ends remaining in a mated relationship and the second ends remaining in a mated relationship, the hood unfolds between the member and the base to provide a privacy cover for the patient. The portable patient privacy apparatus also includes a structure in mechanical communication with the base, wherein the structure is configured to discourage or prevent the patient privacy apparatus from moving after being placed on the hospital bed or gurney.

US 2016/309916 A1 discloses an infant sleeping surface attachment system configured to facilitate vital signs monitoring of, and/or delivering oxygen to, an infant laying on an infant sleeping surface. The system comprises a hood and a cover portion. The hood comprises a fixed portion. The fixed portion includes a mounting apparatus. The fixed portion is configured to be held engaged in a fixed position relative to the infant sleeping surface. The fixed portion forms a cavity having an open mouth formed in part by the infant sleeping surface. The mounting apparatus is configured to engage a vital signs monitoring device and is coupled to the fixed portion inside the cavity. The cover portion is movably coupled with the fixed portion such that the cover portion moves with respect to the fixed portion between a retracted position in which the cover position permits physical access to the cavity and a closed position in which the cover portion covers the open mouth of the fixed portion.

SUMMARY OF THE INVENTION

It is an objective of the present invention to provide a unit comprising a collapsible hood having a generally dome-shaped appearance in an expanded state, configured to be used in combination with a device for supporting a person in a generally lying position, such as a hospital bed or gurney, and to be positioned at a head end of the device. In this context, it is an objective of the present invention to provide a unit that is easy to use, that can quickly be combined with the device for supporting a person in a generally lying position and can also quickly be moved away from the device.

Aspects of the present invention are set out in the accompanying independent claim and dependent claims. Features from the dependent claims may be combined with features from the independent claim as appropriate and not merely as explicitly set out in the claims and explained in the following description.

In view of the foregoing, the present invention provides a mobile unit comprising a collapsible hood having a generally dome-shaped appearance in an expanded state, and a frame supporting the hood on a floor surface, wherein the mobile unit is configured to be used in combination with a device for supporting a person in a generally lying position and to be positioned at a head end of the device. A main function of the hood is covering at least a person's head in the expanded state thereof so as to provide the person with privacy and a (semi-)sheltered experience, and to significantly reduce an extent to which the person is exposed to external stimuli such as movement and noise caused by medical personnel and/or medical devices. When it comes to sleep, having the hood in the expanded state thereof may help the person in getting a more restful sleep. If the person is in a recovery/healing process, good sleep is very beneficial to such a process. Practical examples of the device for supporting a person in a generally lying position include a (hospital) bed and a gurney. In the following, the device will be referred to as person supporting device.

It follows from the above general definition of the unit according to the present invention that the unit is of a mobile nature and comprises a frame besides the collapsible hood, wherein the frame is functional to support the hood on a floor surface. In the context of conventional units, the hood is attachable to the person supporting device in some way. In the context of the present invention, this is not necessary. Instead, it is possible that the mobile unit is configured to be used as a stand-alone unit free from mechanical connection to the person supporting device.

In a practical embodiment of the mobile unit according to the present invention, the entirety of the hood is movable in the mobile unit to assume different height positions relative to the floor surface. This allows for combining the mobile unit with various types of person supporting device, as it provides a possibility to adjust the level of the hood so as to be appropriate in view of the level of the person supporting device. In case the level of the person supporting device is adjustable, the hood can be put in an appropriate position relative to the person supporting device in any position of the latter.

In view of the foregoing, it may be practical if it is the frame that is configured to allow variation of a height position of the hood relative to the floor surface. For example, a design of the frame is feasible in which the frame comprises a base frame part and a carrier frame part, wherein the hood is coupled to the carrier frame part, and wherein the carrier frame part is displaceable relative to the base frame part in height direction. In such a case, it is advantageous if the mobile unit comprises an electric frame drive mechanism that is configured to displace the carrier frame part relative to the base frame part, although the option of manually adjusting the level of the hood by displacing the carrier frame part relative to the base frame part is included in the present invention as well. Practical options in the context of the electric frame drive mechanism include the electric frame drive mechanism comprising at least one electric linear actuator and the carrier frame part being coupled to the base frame part through at least one gas spring.

A practical way of realizing the mobile character of the unit according to the present invention involves equipping the frame with wheels for contacting the floor surface. In such a case, it is advantageous if the mobile unit according to the present invention comprises a mechanism that is configured to act on at least one of the wheels to block rotation of the at least one of the wheels in one position and to enable rotation of the at least one of the wheels in another position.

In the context of the present invention, the collapsible hood may be designed in any suitable way. According to one advantageous option, the hood comprises a number of rigid segments which are movable relative to each other and which are configured to be stowed in a collapsed state of the hood in an arrangement in which, from a segment that is a back segment in an expanding direction of the hood to a segment that is a front segment in the expanding direction of the hood, a segment that is more to the back is received in a space offered by an adjacent segment that is more to the front. An advantage of having rigid segments as mentioned is a high level of hygiene and cleanability.

The following two practical options are applicable to the rigid segments: a) each of the segments comprises a hollow structure of rigid plastic in which a core of foam material is arranged, b) each of the segments is generally U-shaped with two side sections and an intermediate section, wherein the segments are hingably coupled to the frame at the position of ends of their side sections. In respect of the latter option, it is noted that it is advantageous if the segments are mounted on a common hinge shaft, wherein each of the segments with the exception of the back segment is configured to engage on an adjacent segment that is a trailing segment in the expanding direction of the hood after having been hinged about the hinge shaft over a limited angle during an expanding action of the hood. In this configuration, it is possible for the segments to pull each other along when the hood is put from the collapsed state to the expanded state, and it is possible to realize an appropriate positioning of the segments such that a closed appearance of the hood is realized without gaps between the segments. For example, adjacent segments may be coupled to each other through a pin-slot coupling. In any case, it may be practical if an electric hood drive mechanism that is configured to move the front segment is provided, although the present invention also covers the option of manual setting of the state of the hood.

In the case that an electric hood drive mechanism is provided, indeed, it may be so that the electric hood drive mechanism comprises an electric linear actuator. The electric linear actuator may particularly be arranged to interact with the front segment. Further, it may be so that a coupling arrangement between the electric hood drive mechanism and the front segment is configured to enable decoupling the front segment from the electric hood drive mechanism under the influence of external forces acting on the front segment to move the front segment about the hinge shaft. In that way, it is always possible to allow manual setting of the state of the hood, which may be desirable in view of emergency situations in which the hood is to be put from the expanded state to the collapsed state without delay. The coupling arrangement as mentioned may comprise at least one element that is biased to a position for coupling the front segment to the electric hood drive mechanism, in which case decoupling the front segment from the electric hood drive mechanism can take place when the external forces are large enough move the at least one element away from that position.

Also in view of emergency situations, or at least situations of inconvenience of a person whose head is covered by the hood in the expanded state, it may be desirable to have an arrangement of the back segment of the hood in which the back segment is movable in the expanding direction of the hood from a default rest position to a position for creating open space at a backside of the hood.

Assuming that the mobile unit comprises one or more electric components, it is practical if the mobile unit comprises two user interfaces configured to receive input of a user for operating one or more electric components of the mobile unit, wherein one of the user interfaces is at a position that is accessible from inside the hood when the hood is in the expanded state. In this way, both a person who is present on the person supporting device and a person who is present besides the person supporting device, such as a caregiver, are enabled to put the hood to a state as desired and/or a level as desired. Further, it may be practical if the mobile unit comprises a battery that is electrically coupled to one or more electric components of the mobile unit for supplying electric energy to the one or more electric components, although it is also possible that the mobile unit is configured to enable direct connection of the electric components to an external energy source, particularly the mains.

The mobile unit can be used for supporting various kinds of electric devices as desired. In this respect, the mobile unit may comprise at least one electric device chosen from the group including an entertainment device, a communication device, a medical device equipped with at least one sensor configured to detect at least one medical parameter, a sleep monitoring device and a wake-up device. For example, the mobile unit may be equipped with a flatscreen and/or a sound system, and also with an active noise cancellation system. Other examples of electric devices are feasible in the context of the present invention as well, such as lighting devices. The at least one electric device may particularly be arranged at an inside position of the hood, such as on the front segment in the practical case that the hood comprises segments, as suggested in the foregoing. Further, it may be handy if the frame comprises at least one area that is configured to support one or more external items. For example, a support for an infusion bag may be integrated in the frame at a practical position on the frame.

BRIEF DESCRIPTION OF THE DRAWINGS

Further features and advantages of the present invention will become apparent from the description of the invention by way of exemplary and non-limiting embodiments of a mobile unit for placement at a head end of a person supporting device and components of such a unit.

The person skilled in the art will appreciate that the described embodiments of the unit according to the present invention are exemplary in nature only and not to be construed as limiting the scope of protection defined in the claims in any way. The person skilled in the art will realize that alternatives and equivalent embodiments of the unit can be conceived and reduced to practice without departing from the scope of protection of the present invention.

Figure 1:
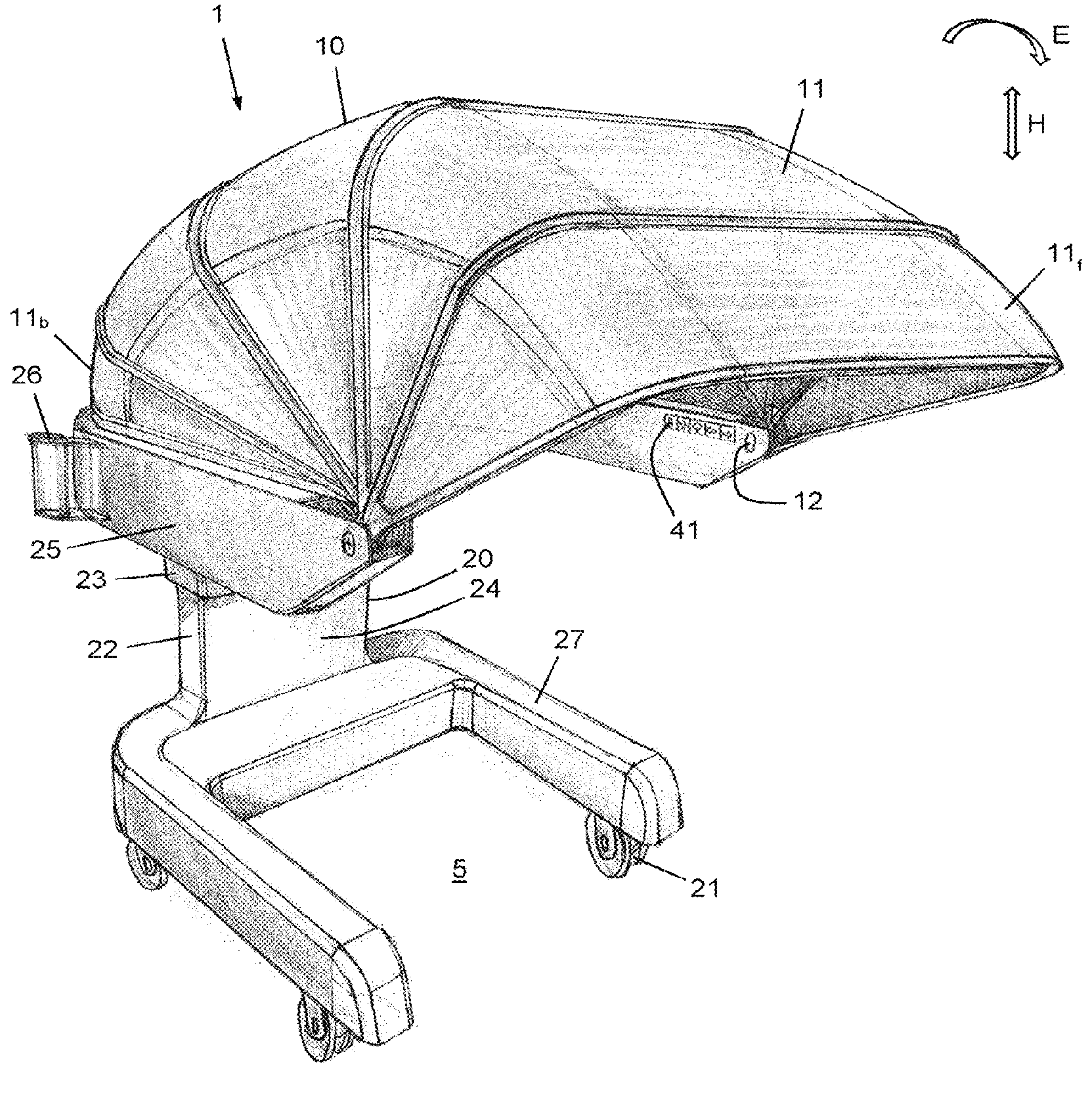
Figure 2:
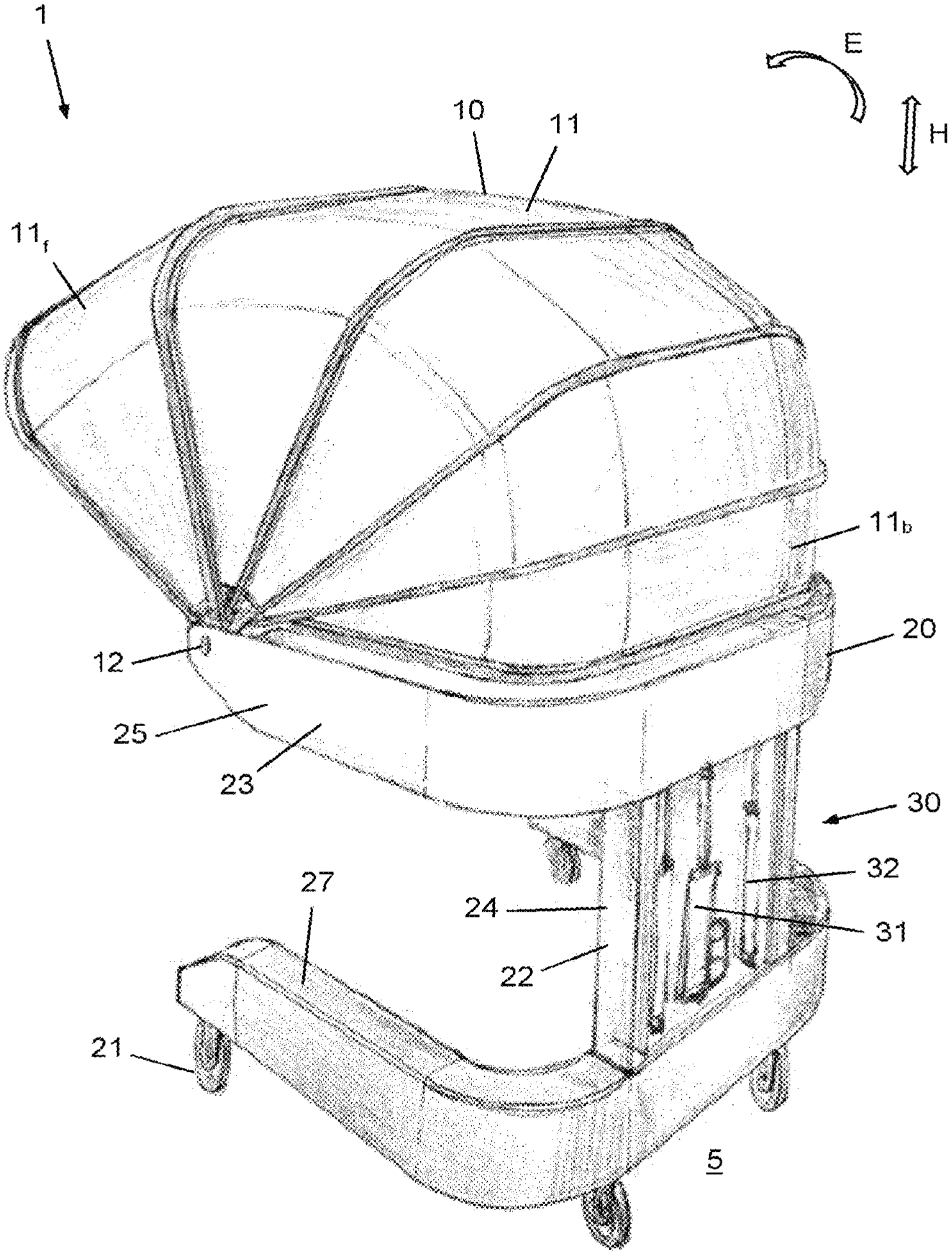
Figure 3:
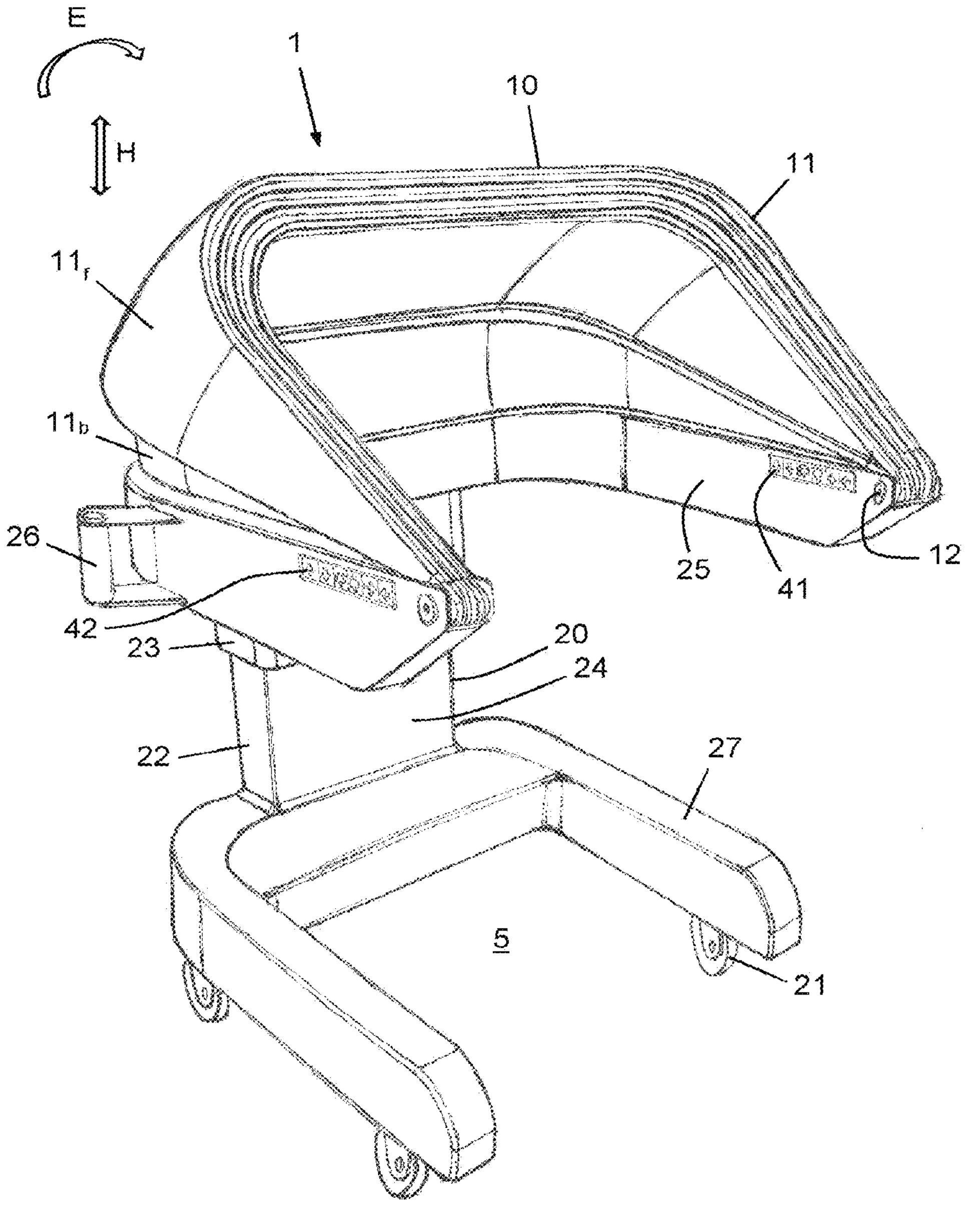
Figure 4:
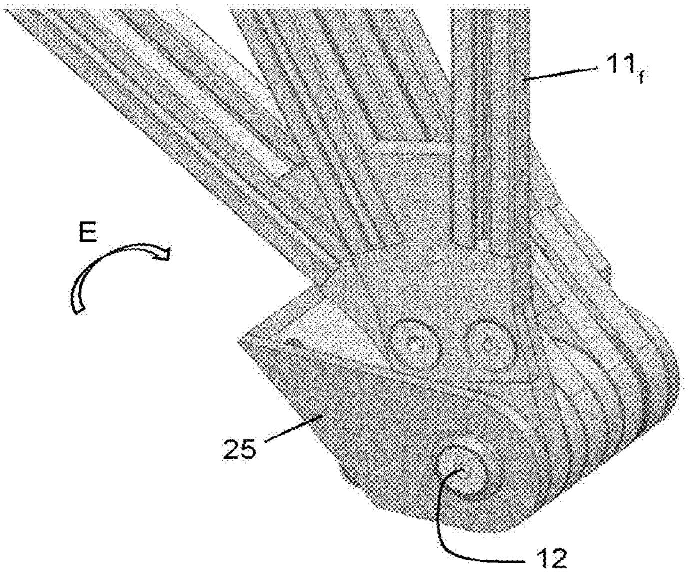
Figure 5:
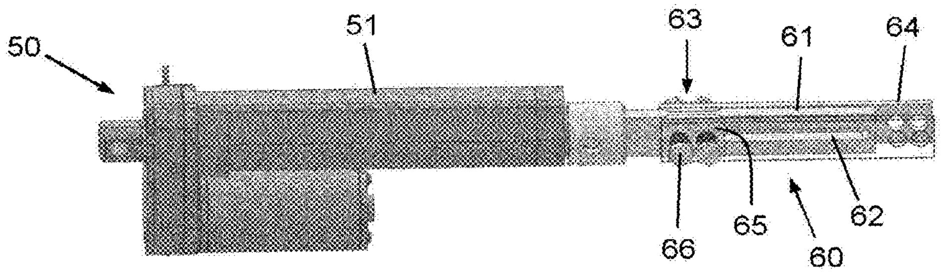
Figure 6:
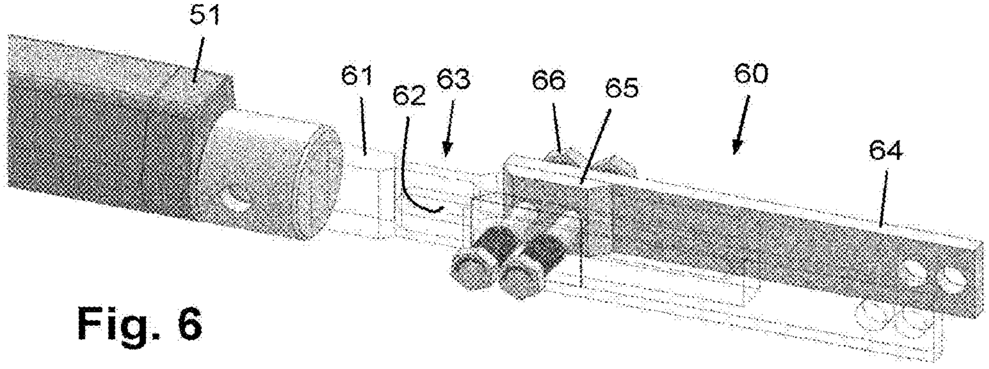

Reference will be made to the figures on the accompanying drawing sheets. The figures are schematic in nature and therefore not necessarily drawn to scale. Further, equal reference numerals denote equal or similar parts. On the attached drawing sheets, FIG. 1 diagrammatically shows a perspective view of a mobile unit according to an embodiment of the present invention, with a hood of the mobile unit in an expanded state;

FIG. 2 diagrammatically shows another perspective view of the mobile unit, with the hood in the expanded state and a back panel of a frame of the mobile unit removed;

FIG. 3 diagrammatically shows a perspective view of the mobile unit, with the hood in a collapsed state;

FIG. 4 diagrammatically shows a perspective view of a portion of the mobile unit including a common hinge shaft of segments of the hood;

FIG. 5 diagrammatically shows components of both an electric hood drive mechanism that serves to move a front segment of the hood and a coupling arrangement; and FIG. 6 illustrates a state of the coupling arrangement in which decoupling of the electric hood drive mechanism from the front segment of the hood is enabled.

DETAILED DESCRIPTION OF EMBODIMENTS

FIGS. 1, 2 and 3 show a mobile unit 1 according to an embodiment of the present invention. The mobile unit 1 comprises a collapsible hood 10 having a generally dome-shaped appearance in an expanded state, and a frame 20 supporting the hood 10 on a floor surface 5. The mobile unit 1 is configured to be used in combination with a person supporting device such as a hospital bed or the like (not shown), particularly to be positioned at a head end of the person supporting device so that the hood 10 can be used to cover a space around the head of a person lying on the device or to leave such space open, according to desire.

In the shown embodiment of the mobile unit 1, the frame 20 is movable on the floor surface 5 through wheels 21 arranged at a floor-facing side of the frame 20. Thus, the mobile unit 1 can be displaced very easily on the floor surface 5, can be rolled towards and away from a person supporting device as appropriate, can be taken to an area for cleaning purposes, etc.

According to a practical aspect of the mobile unit 1, a height position of the hood 10 relative to the floor surface 5 is adjustable. To that end, the frame 20 comprises a base frame part 22 and a carrier frame part 23, wherein the hood 10 is coupled to the carrier frame part 23, and wherein the carrier frame part 23 is displaceable relative to the base frame part 22 in height direction H. A practical example of a distance range along which the carrier frame part may be movable in the height direction H is 300 mm. For the purpose of displacing the carrier frame part 23 relative to the base frame part 22, the mobile unit 1 is equipped with an electric frame drive mechanism 30.

The mobile unit 1 is equipped with at least one user interface 41 by means of which the electric frame drive mechanism 30 can be operated and other actions can be performed. FIG. 3 illustrates the option of the mobile unit 1 comprising two identical user interfaces 41, 42, wherein one of the user interfaces 41, 42 is an interior interface 41 that is arranged so as to be accessible from inside the hood 10 when the hood 10 is in the expanded state, so that the user interface 41 is within reach of a person lying on a person supporting device of which the head end is covered by the hood 10, and wherein the other of the user interfaces 41, 42 is an exterior interface 42 that is at an outside position on the frame 20.

The electric frame drive mechanism 30 is shown in FIG. 2 and may be designed in any suitable way. In the shown example, the electric frame drive mechanism 30 comprises an electric linear actuator 31 and two gas springs 32 which are mounted in a column-like portion 24 of the base frame part 22. Sides of the column-like portion 24 of the base frame part 22 can be made of stainless steel tubes, for example, or of metal plates with flanged edges, so that a stiff construction is obtained that is capable of absorbing the bending moment resulting from gravity acting on a generally U-shaped portion 25 of the carrier frame part 23 that is configured to surround the head end of the person supporting device. Also, the column-like portion 24 of the base frame part 22 is functional to guide movements of the carrier frame part 23 relative to the base frame part 22. The way in which the carrier frame part 23 is mounted on the base frame part 22 is chosen such that the electric frame drive mechanism 30 is shielded from dust and dirt and that sufficient space for guiding members is present so that jamming may be avoided. The gas springs 32 act against gravity, to thereby contribute to the lifting forces as may be exerted by the electric linear actuator 31, as well as to stability of the construction despite of the use of only one electric linear actuator 31.

The hood 10 comprises a number of rigid segments 11 which are movable relative to each other. In a collapsed state of the hood 10, as shown in FIG. 3, the segments 11 are stowed in an arrangement in which, from a segment 11 that is a back segment **11*b* in an expanding direction E of the hood 10 to a segment 11 that is a front segment 11*r* in the expanding direction E of the hood 10, a segment 11 that is more to the back is received in a space offered by an adjacent segment 11 that is more to the front, so that the segments 11 are positioned so as to encompass each other like the peels of an onion. In view thereof, the segments 11 are of different size, wherein a space offered by the back segment 11*b* is the smallest and a space offered by the front segment 11** is the largest.

As can be seen in FIGS. 1, 2 and 3, each of the segments 11 is generally U-shaped with two side sections and an intermediate section, wherein the segments 11 are hingably coupled to the frame 20 at the position of ends of their side sections. In particular, the segments 11 are mounted on a common hinge shaft 12, as can be seen best in the detailed view of FIG. 4, wherein suitable bearings between each of the segments 11 and the hinge shaft 12 may be applied. Advantageously, each of the segments 11 with the exception of the back segment **11*b* is configured to engage on an adjacent segment 11 that is a trailing segment 11 in the expanding direction E of the hood 10 after having been hinged about the hinge shaft 12 over a limited angle during an expanding action of the hood 10. In that case, starting from the collapsed state of the hood 10, imposing movement on the front segment 11*f* suffices pull all of the segments 11 with the exception of the back segment 11*b* to the respective positions of the segments 11 associated with the expanded state of the hood 10. This can be done by means of an electric hood drive mechanism 50 that is configured to move the front segment 11*f***.

Components of the electric hood drive mechanism 50 and of a coupling arrangement 60 connected to the electric hood drive mechanism 60, as may be provided at one or both of the sides of the front segment 11 of the hood 10, are shown in FIGS. 5 and 6. It is to be noted that for illustration purposes, portions of the components of the coupling arrangement 60 are depicted in a transparent fashion. In the shown example, the electric hood drive mechanism 50 comprises an electric linear actuator 51. The coupling arrangement 60 is provided to couple the front segment **11*f*, particularly a portion of the front segment 11*r* surrounding the hinge shaft 12, to the electric linear actuator 51 under normal circumstances and to enable an action of decoupling the front segment 11***f* from the electric linear actuator 51 in emergency situations, under the influence of external forces acting on the front segment 11; to move the front segment 11*r* about the hinge shaft 12, which external forces are realized by a person taking hold of the front segment 11*r* and pushing to put the hood 10 from the expanded state to the collapsed state. To that end, the coupling arrangement 60 comprises a basic element 61 extending from the electric linear actuator 51 and provided with a slot 62 and recessed portions 63 at opposite positions on the basic element 61, and also two arms 64 which are couplable to the front segment 11*r* at a free end thereof, and which are provided with protruding portions 65 fitting the recessed portions 63 on the basic element 61. Under the influence of spring-mounted elements 66 extending through the slot 62 in the basic element 61, the arms 64 are normally held against the basic element 61 in such a position that the protruding portions 65 of the arms 64 are accommodated in the recessed portions 63 of the basic element 61.

When the hood 10 is manually put from the expanded state to the collapsed state, the manually exerted forces act to move the arms 64 further along the basic element 61. In the process, the forces exerted by the springs of the spring-mounted elements 66 are counteracted, so that the protruding portions 65 of the arms 64 are enabled to actually move out of the recessed portions 63 of the basic element 61, wherein the movement of the arms 64 relative to the basic element 61 is guided under the influence of the spring-mounted elements 66 sliding in the slot 62 in the basic element 61. A position of the arms 64 relative to the basic element 61 as shown in FIG. 6 is obtained, in which position the arms 64 have moved apart so that a situation is realized in which the front segment 11*r* can be moved independently from the electric linear actuator 51, indeed. When the electric linear actuator 51 is activated to put the hood 10 to the expanded state again, the protruding portions 65 of the arms 64 are received back in the recessed portions 63 of the basic element 61 at a certain point during the invoked movement of the basic element 61, so that the normal, default configuration of the coupling arrangement 60 is restored.

The mobile unit 1 may be provided with any added device according to desire, such as a flatscreen and a sound system. Also, one or more areas of the mobile unit 1 may be shaped so as to enable support of one or more external items. In this respect, a support 26 on the carrier frame part 23 for an infusion bag can be seen in FIGS. 1 and 3. Also, one or more grips or the like can be arranged on the mobile unit 1 to facilitate handling of the mobile unit 1.

The dimensioning of the mobile unit 1 is chosen in relation to the intended use of the mobile unit 1. In this respect, it is noted that a width of the generally U-shaped portion 25 of the carrier frame part 23 can be chosen such that the U-shaped portion 25 is capable of surrounding a head end of a hospital bed or gurney at close range. Also, a width of a generally U-shaped bottom portion 27 of the base frame part 22 can be chosen such as to leave sufficient space for a hospital bed or gurney.

It will be clear to a person skilled in the art that the scope of the present invention is not limited to the examples discussed in the foregoing but that several amendments and modifications thereof are possible without deviating from the scope of the present invention as defined by the attached claims. In particular, combinations of specific features of various aspects of the invention may be made. An aspect of the invention may be further advantageously enhanced by adding a feature that was described in relation to another aspect of the invention. While the present invention has been illustrated and described in detail in the figures and the description, such illustration and description are to be considered illustrative or exemplary only, and not restrictive.

The present invention is not limited to the disclosed embodiments. Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference numerals in the claims should not be construed as limiting the scope of the present invention.

Notable aspects of the present invention are summarized as follows. For the purpose of covering at least the head of a person lying on a person supporting device such as a hospital bed or gurney, a unit 1 comprising a hood 10 is provided. The unit 1 is particularly a mobile unit 1 so that the unit 1 can be easily put in place relative to a person supporting device or moved away from a person supporting device and taken to another area. The hood 10 has a generally dome-shaped appearance and can be put in an expanded state and in a collapsed state according to desire. The mobile unit 1 further comprises a frame 20 for supporting the hood 10 on a floor surface 5, independent of a person supporting device. Preferably, the unit 1 is configured to enable adjustment of a height position of the hood 10 relative to the floor surface 5. Notable functions of the hood 10 are providing privacy to a person and shielding the person from external stimuli. Also, the hood 10 can be used for supporting a flatscreen or the like.

What is claimed is:

1. A mobile unit comprising:

a collapsible hood having a generally dome-shaped appearance in an expanded state, and a frame supporting the hood on a floor surface, wherein the mobile unit is configured to be used in combination with a device for supporting a person in a generally lying position and to be positioned at a head end of the device; and wherein the frame is equipped with wheels which are arranged to contact the floor surface.

2. The mobile unit according to claim 1, wherein the mobile unit is configured to be used as a stand-alone unit free from mechanical connection to the device for supporting a person in a generally lying position.

3. The mobile unit according to claim 1, wherein the entirety of the hood is movable in the mobile unit to assume different height positions relative to the floor surface.

4. The mobile unit according to claim 1, wherein the frame is configured to allow variation of a height position of the hood relative to the floor surface.

5. The mobile unit according to claim 1, wherein the frame comprises a base frame part and a carrier frame part, wherein the hood is coupled to the carrier frame part, and wherein the carrier frame part is displaceable relative to the base frame part in a height direction (H).

6. The mobile unit according to claim 5, comprising an electric frame drive mechanism that is configured to displace the carrier frame part relative to the base frame part.

7. The mobile unit according to claim 6, wherein the electric frame drive mechanism comprises at least one electric linear actuator.

8. The mobile unit according to claim 6, wherein the carrier frame part is coupled to the base frame part through at least one gas spring.

9. The mobile unit according to claim 1, comprising a mechanism that is configured to act on at least one of the wheels to block rotation of the at least one of the wheels in one position and to enable rotation of the at least one of the wheels in another position.

10. The mobile unit according to claim 1, wherein the hood comprises a number of rigid segments which are movable relative to each other and which are configured to be stowed in a collapsed state of the hood in an arrangement in which, from a segment that is a back segment in an expanding direction (E) of the hood to a segment that is a front segment in the expanding direction (E) of the hood, a segment that is more to the back is received in a space offered by an adjacent segment that is more to the front.

11. The mobile unit according to claim 10, wherein each of the segments is generally U-shaped with two side sections and an intermediate section, and wherein the segments are hingably coupled to the frame at the position of ends of their side sections.

12. The mobile unit according to claim 10, wherein the back segment is movable in the expanding direction (E) of the hood from a default rest position to a position for leaving space at a backside of the hood.

13. The mobile unit according to claim 1, comprising two user interfaces configured to receive input of a user for operating one or more electric components of the mobile unit, wherein one of the user interfaces is at a position that is accessible from inside the hood when the hood is in the expanded state.

14. The mobile unit according to claim 1, comprising a battery that is electrically coupled to one or more electric components of the mobile unit for supplying electric energy to the one or more electric components.

15. The mobile unit according to claim 1, comprising at least one electric device chosen from the group including an entertainment device, a communication device, a medical device equipped with at least one sensor configured to detect at least one medical parameter, a sleep monitoring device and a wake-up device.

16. The mobile unit according to claim 15, wherein the at least one electric device is arranged at an inside position of the hood.

17. The mobile unit according to claim 1, wherein the frame comprises at least one area that is configured to support one or more external items.

18. A mobile unit comprising:
- a collapsible hood having a generally dome-shaped appearance in an expanded state, and
- a frame supporting the hood on a floor surface,
- wherein the mobile unit is configured to be used in combination with a device for supporting a person in a generally lying position and to be positioned at a head end of the device;
- wherein the hood comprises a number of rigid segments which are movable relative to each other and which are configured to be stowed in a collapsed state of the hood in an arrangement in which, from a segment that is a back segment in an expanding direction (E) of the hood to a segment that is a front segment in the expanding direction (E) of the hood, a segment that is more to the back is received in a space offered by an adjacent segment that is more to the front; and
- wherein each of the segments comprises a hollow structure of rigid plastic in which a core of foam material is arranged.

19. A mobile unit comprising:
- a collapsible hood having a generally dome-shaped appearance in an expanded state, and
- a frame supporting the hood on a floor surface,
- wherein the mobile unit is configured to be used in combination with a device for supporting a person in a generally lying position and to be positioned at a head end of the device;
- wherein the hood comprises a number of rigid segments which are movable relative to each other and which are configured to be stowed in a collapsed state of the hood in an arrangement in which, from a segment that is a back segment in an expanding direction (E) of the hood to a segment that is a front segment in the expanding direction (E) of the hood, a segment that is more to the back is received in a space offered by an adjacent segment that is more to the front;
- wherein each of the segments is generally U-shaped with two side sections and an intermediate section, and wherein the segments are hingably coupled to the frame at the position of ends of their side sections; and
- wherein the segments are mounted on a common hinge shaft, and wherein each of the segments with the exception of the back segment is configured to engage on an adjacent segment that is a trailing segment in the expanding direction (E) of the hood after having been hinged about the hinge shaft over a limited angle during an expanding action of the hood.

20. The mobile unit according to claim 19, wherein adjacent segments are coupled to each other through a pin-slot coupling.

21. The mobile unit according to claim 19, comprising an electric hood drive mechanism that is configured to move the front segment.

22. The mobile unit according to claim 21, wherein the electric hood drive mechanism (50) comprises an electric linear actuator.

23. The mobile unit according to claim 22, wherein a coupling arrangement between the electric hood drive mechanism and the front segment is configured to enable decoupling the front segment ($11_f$) from the electric hood drive mechanism under the influence of external forces acting on the front segment to move the front segment about the hinge shaft.

24. The mobile unit according to claim 23, wherein the coupling arrangement comprises at least one element that is biased to a position for coupling the front segment to the electric hood drive mechanism.

* * * * *